July 6, 1965 D. C. ROCKOLA 3,193,296
VARIABLE SPEED PHONOGRAPH
Filed March 19, 1962 8 Sheets-Sheet 1

INVENTOR.
Donald C. Rockola
BY Horton, Davis,
Brewer & Brugman
Attys.

July 6, 1965  D. C. ROCKOLA  3,193,296
VARIABLE SPEED PHONOGRAPH
Filed March 19, 1962  8 Sheets-Sheet 4

INVENTOR.
Donald C. Rockola
BY Horton, Davis,
Brewer + Brugman
Attys.

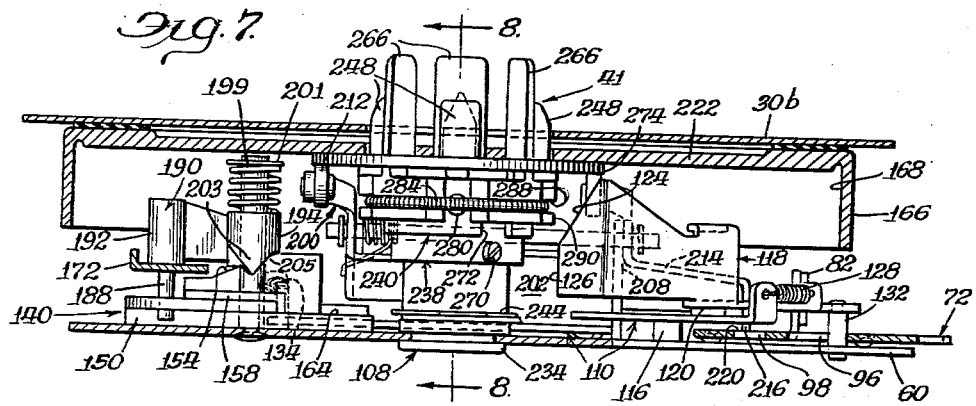
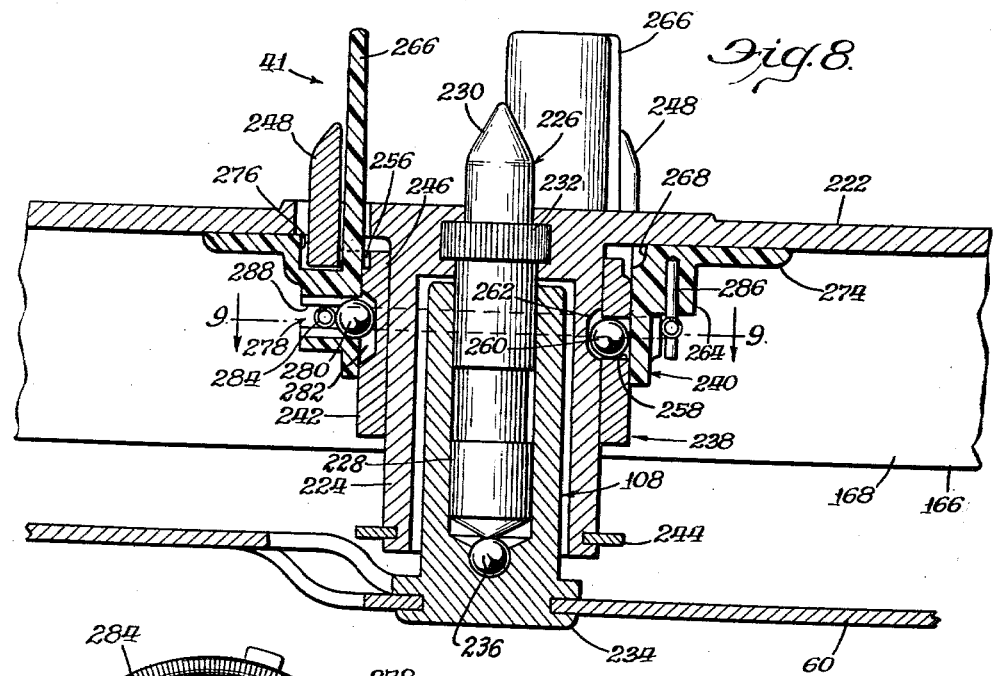
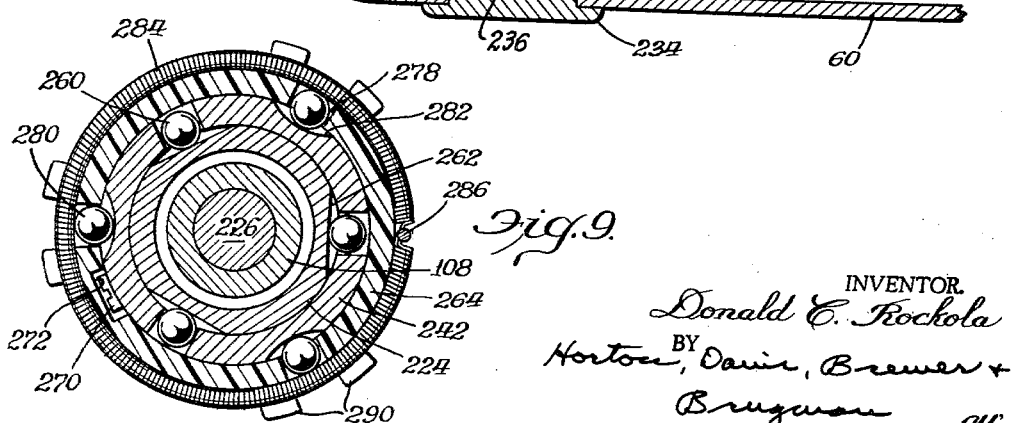

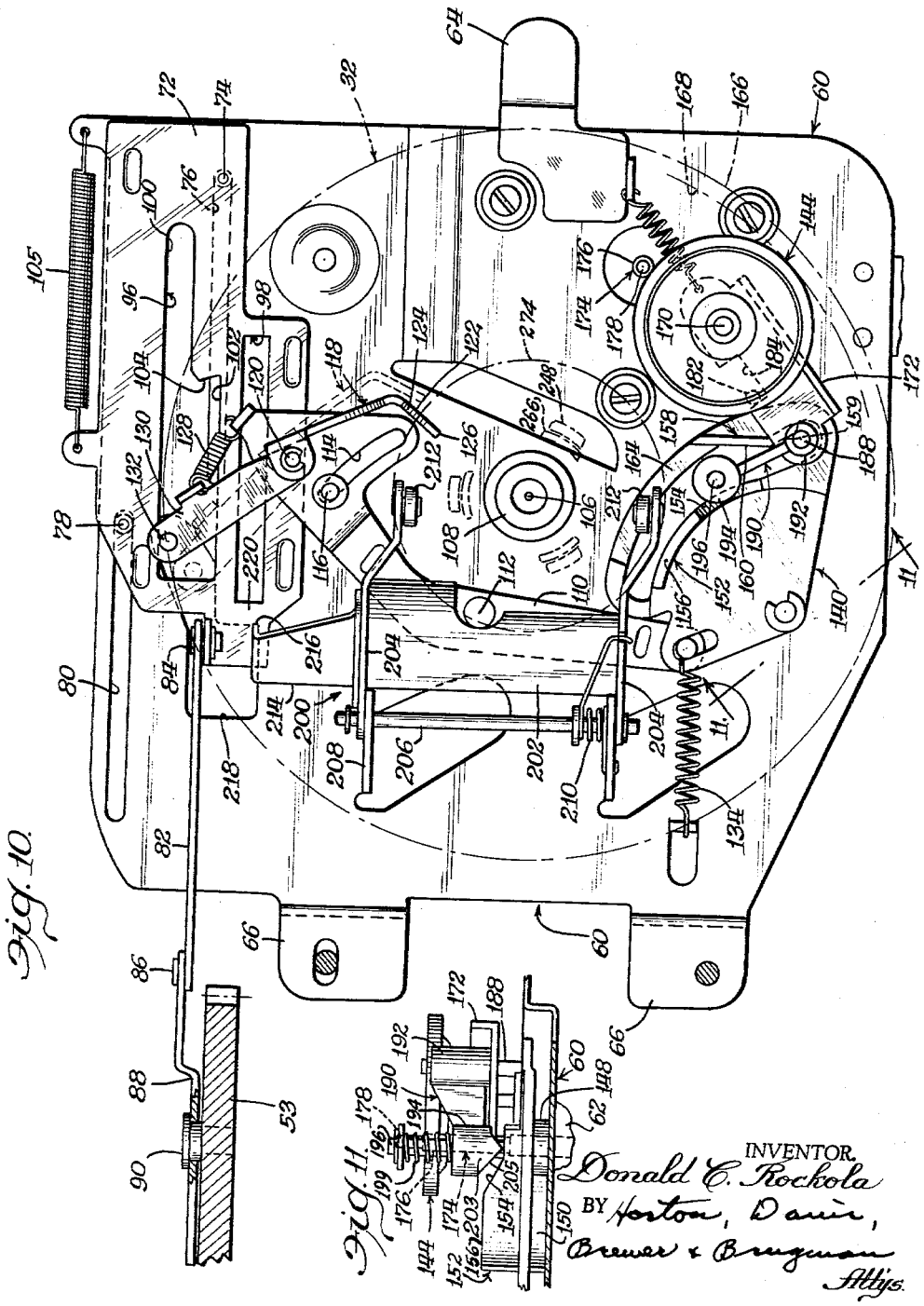

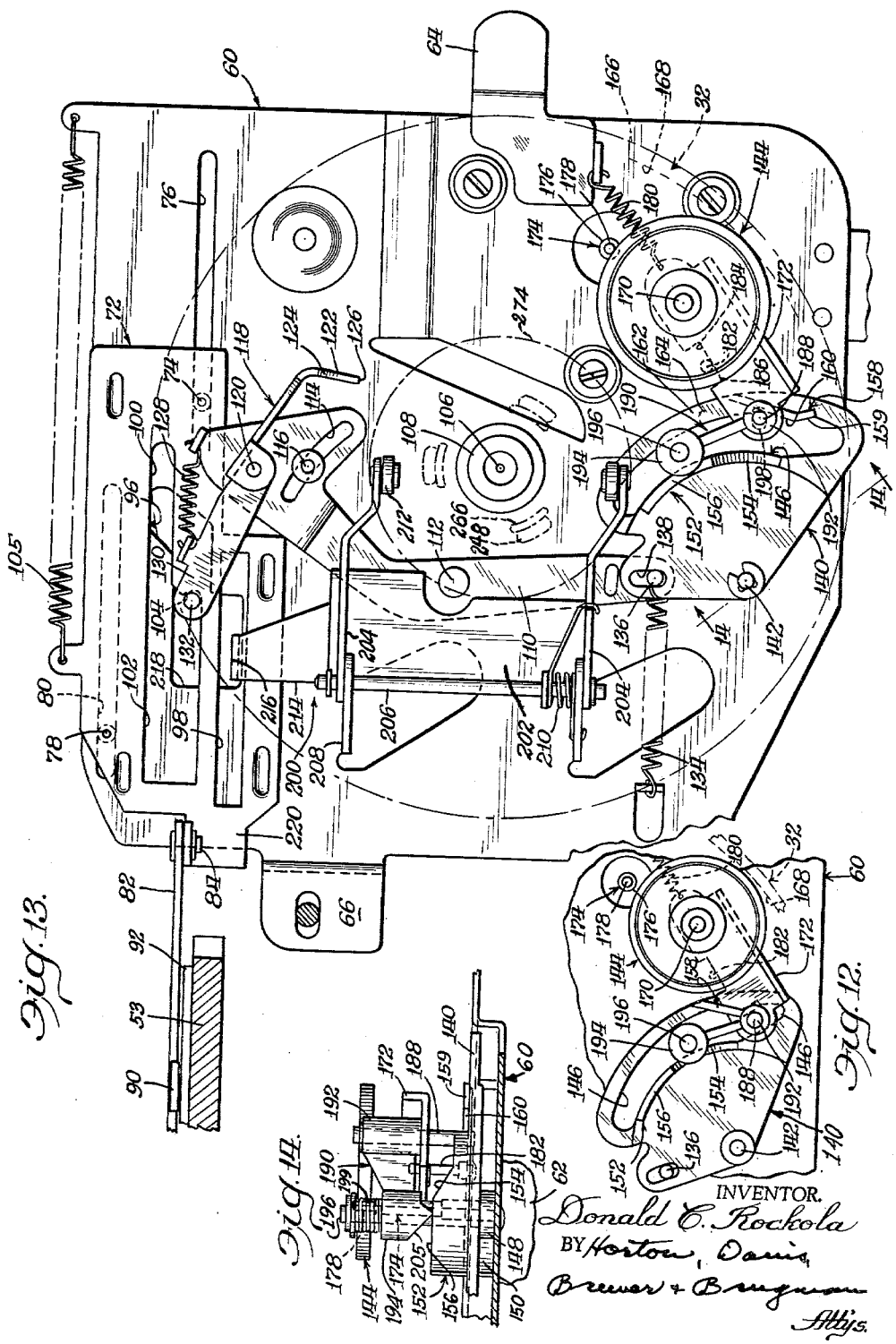

INVENTOR.
Donald C. Rockola
BY Horton, Davis, Brewer
& Bruguman Attys.

United States Patent Office 3,193,296
Patented July 6, 1965

3,193,296
VARIABLE SPEED PHONOGRAPH
Donald C. Rockola, Chicago, Ill., assignor to Rock-Ola Manufacturing Corporation, Chicago, Ill., a corporation of Delaware
Filed Mar. 19, 1962, Ser. No. 180,726
20 Claims. (Cl. 274—10)

The present invention relates to a variable speed automatic phonograph.

A principal use of the invention is in conjunction with a coin controlled automatic phonograph.

Phonograph records as currently produced include different kinds for operating at different speeds. The most popular speeds at present are those made for 33⅓ and for 45 r.p.m. speeds, both of which are extensively used in automatic phonographs. It is desired to provide for indiscriminate placing the records of different speeds in a phonograph and playing them, without any predetermined manual control or maneuver, such as placing the records in certain positions, etc.

It is an object therefore of the present invention to provide a new mechanism for an automatic phonograph that will sense records made for different speeds of operation, automatically, and play them according to the intended speed of operation.

The two kinds of records noted, namely the 33⅓ and 45 r.p.m. as produced for coin controlled automatic phonographs, are provided with center holes of different sizes, i.e., the 33⅓ record has a small center hole, while the 45 record has a large center hole. The mechanism of the present invention utilizes this difference in size in the center hole for sensing and detecting the records of the two kinds and setting up the phonograph for operation according to the intended respective speeds thereof.

Another object is to provide a variable speed mechanism of the foregoing general character that is completely mechanical in character and operation.

Another object is to provide mechanism of the character indicated, which is of extremely compact arrangement for incorporation in limited space in presently existing phonographs, but which is arranged in such a novel manner that the movements of the mechanical elements thereof are in such direction and relation to each other as to provide relatively great mechanical advantage in the ultimate functioning of the elements controlled.

A further object is to provide a mechanical variable speed mechanism of the character indicated, which is of extremely rugged construction and capable of withstanding rough usage, but which is also capable of relatively precision operation.

Still another object is to provide variable speed mechanism of the foregoing general character that, while being of entirely mechanical nature, is extremely fast acting.

Another object is to provide variable speed mechanism of the foregoing general character which, because of its nature, incorporates sensing means in the turntable usually incorporated in the phonograph but in which, notwithstanding the incorporation of this mechanism in the turntable, the turntable is extremely precision balanced and free to rotate without hindrance, whereby to maintain accurate rotating speed of the record thereon.

Other objects and advantages of the invention will appear from the following detailed description taken in conjunction with the accompanying drawings, in which:

FIGURE 7 is a sectional view taken substantially at line 7—7 of FIGURE 4, on an enlarged scale, but omitting certain members in that view;

FIGURE 8 is a sectional view taken at line 8—8 of FIGURE 7, but on an enlarged scale;

FIGURE 9 is a sectional view taken at line 9—9 of FIGURE 8;

FIGURE 10 is a plan view of certain mechanism located under the turntable, on an enlarged scale, and taken approximately at line 10—10 of FIGURE 4;

FIGURE 11 is a fragmentary view taken substantially at line 11—11 of FIGURE 10;

FIGURE 12 is a fragmentary plan view of a portion of the mechanism at the bottom portion of FIGURE 10;

FIGURE 13 is a plan view similar to FIGURE 10, but with certain parts in different positions;

FIGURE 14 is a fragmentary view taken substantially at line 14—14 of FIGURE 13;

Figure 1:
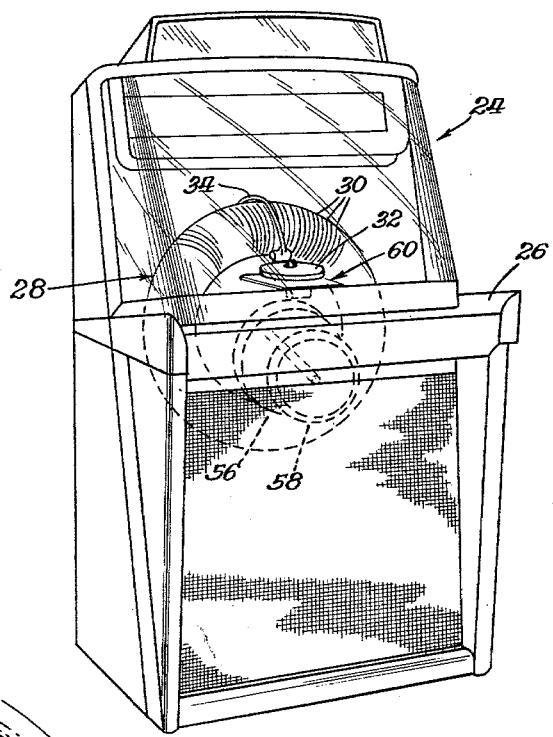
FIGURE 1 is a perspective view of a phonograph of a kind adapted to incorporation of the present invention therein.
Figure 2:
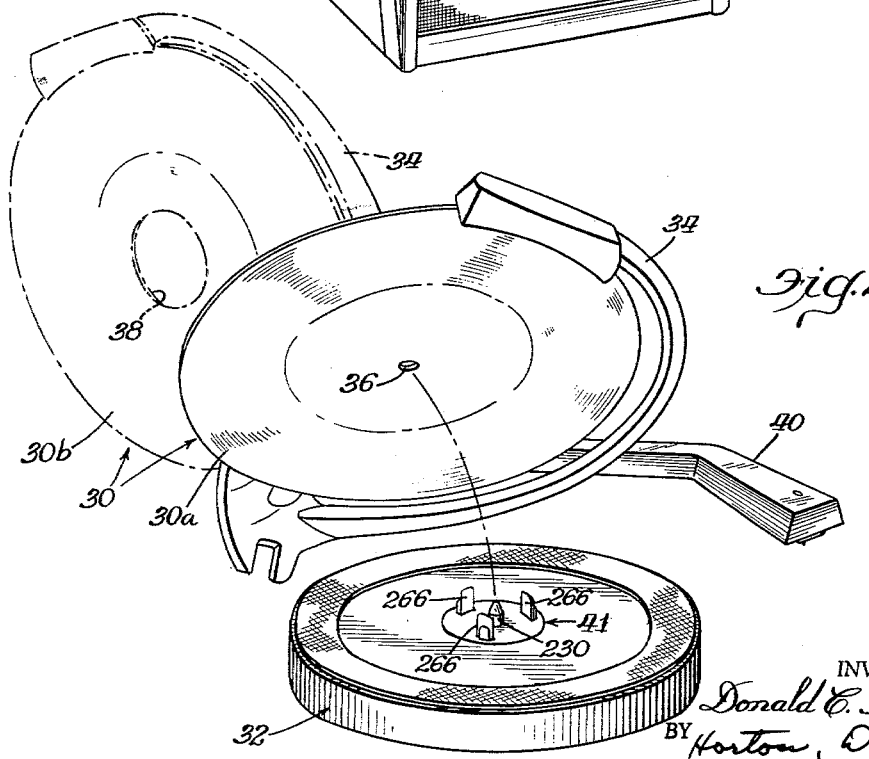
FIGURE 2 is a perspective view of certain elements isolated from the phonograph, including a turntable, and views of the two different kinds of records accommodated.

Referring now in detail to the drawings, attention is directed first to FIGURE 1, showing an automatic phonograph as a whole at 24, of a type to which the present invention is adapted. In FIGURE 1 the phonograph includes a cabinet 26 in which most of the operating parts are enclosed, and certain ones of which are shown in FIGURE 1. These operating parts include the magazine 28 for retaining a plurality of records 30, a turntable 32 on which the records are placed for playing, by means of a transfer mechanism which includes a gripper arm 34. The two kinds of records referred to above to which the example of the invention is particularly adapted are represented in FIGURE 2, where 30a is a "33⅓" record, i.e., a record made for rotating 33⅓ revolutions per minute in the normal playing thereof; the other record 30b, which is a "45" record, i.e., one made for rotating 45 revolutions per minute in the normal playing thereof. It will be noted that the 33⅓ record 30a includes a small central aperture 36, while the 45 record is provided with a relatively large aperture 38. A tone arm 40 is included in the illustration of FIGURE 2, as well as other figures of the drawings. The automatic phonograph illustrated includes many operating parts which may be the same as or similar to those of any of various previous forms of phonographs, such as, for example, illustrated in U.S. Patent No. 2,804,307, issued August 27, 1957, to David C. Rockola. Reference may be had to that patent for a description of all of the details in common with the present application, but a brief description of certain of the parts of that kind of phonograph are given herein for convenience.

The magazine 28 is mounted for rotation on a horizontal axis by means of a shaft 42 (FIG. 4), and is provided with a ring gear 44 through which the magazine may be driven. The magazine is rotated for selectively moving a predetermined record up to an indexing position which in the present instance is at or adjacent the top of the magazine, where it is positioned for gripping by the gripper arm 34 (FIGS. 1–4). The record when selected, according to the normal operation of the machine, is transferred from the magazine to the turntable 32 for playing and, after playing, transferred back to the magazine. The magazine may contain both 33⅓ and 45 records intermingled indiscriminately therein and upon placement of a record on the turntable, a sensing means is operative for setting up the phonograph for playing the record according to whether it is a 33⅓ or 45 record. The direct means utilized in this sensing operation is the size of the aperture 36 or 38 in the record, the solid portion of the record surrounding the aperture in the case of the 33⅓ record being utilized for actuating the sensing mechanism. That portion of the sensing mechanism which is exposed through the turntable for engagement by the record is indicated in its entirety at 41 (FIGS. 1–4, 7, 8).

The drive means for operating the gripper arm 34 includes a suitable motor, such as an electric motor 46 (FIG. 3) operative, through gearing 48, for driving a shaft 50 (FIGS. 3–6) on which is mounted a gear 52. This shaft 50 extends transverse to the horizontal axis of the magazine 28, and to the vertical axis of the turntable 32. The gear 52 meshes with a gear 53, these gears being part of a gearing 54 which may include a Geneva movement. Upon rotation of certain of the elements of the gearing 54, the gripper arm 34 is swung about the axis of the gear 53 between its position for gripping a record in the magazine (FIGS. 1 and 3) and its opposite position in which the record is placed horizontally on the turntable, which is just below that represented in solid lines in FIGURE 2. It will be understood that the gears 52 and 53 oscillate for producing the desired swinging movements of the gripper arm 34.

In front of the magazine 28 is a selector drum 56, and forwardly of the latter is a popularity meter 58, both coaxial with the magazine. The foregoing mechanism, except for the sensing means in the turntable, is also included in the automatic phonograph of the above-mentioned patent.

Figure 3:
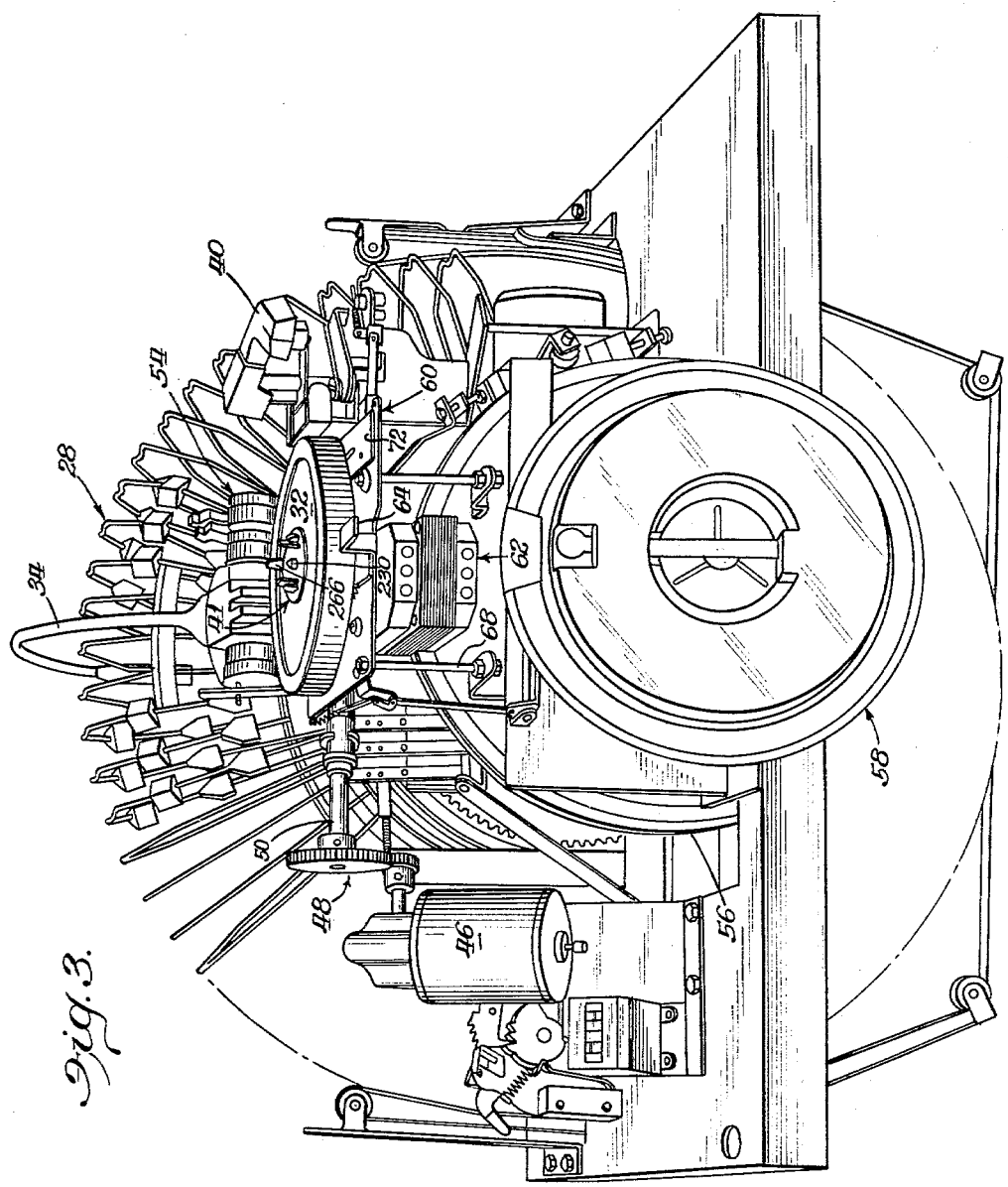
FIGURE 3 is a perspective view of the general internal and main portions of the operating mechanism of the phonograph, removed from the cabinet.
Figure 4:
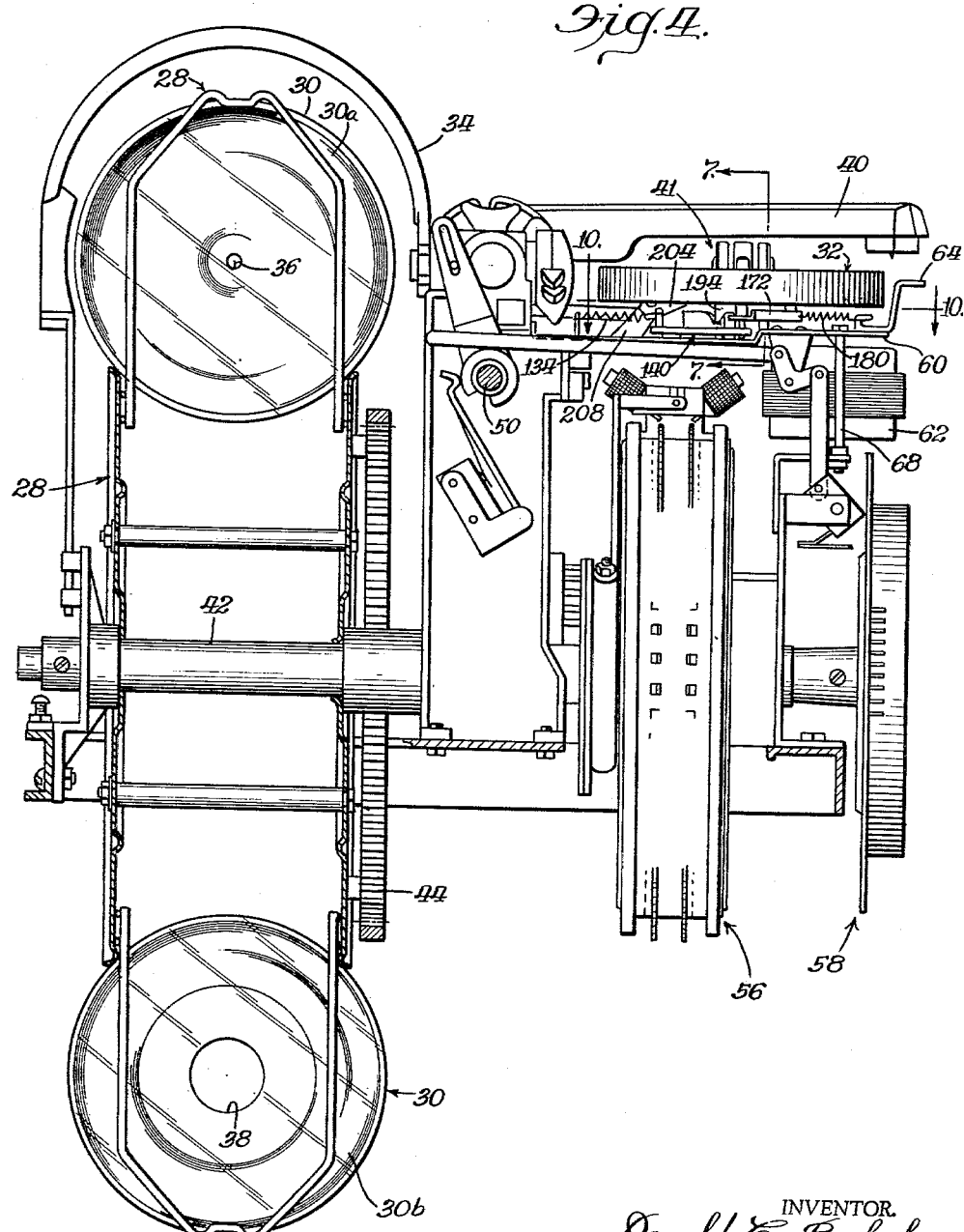
FIGURE 4 is a vertical fore and aft sectional view of the mechanism shown in FIGURE 3, looking to the right as oriented in FIGURE 3.

The construction of the phonograph in general above described serves as a background for the description of the mechanism of the present invention, and from this description and the drawings, particularly FIGURES 3 and 4, it will be seen that a compact arrangement is presented relative to the turntable and the parts of the operating mechanism thereunder. The turntable is mounted directly on a horizontal mounting plate 60, which is disposed above and closely adjacent the selector drum 56. Such a mounting plate is included in the device of the prior patent mentioned, but in the present instance the mounting plate, while generally similar in shape, is slightly modified to accommodate certain portions of the mechanism of the present invention. However, the former mounting plate is readily replaceable by the present, resulting in easy adaptation of the invention to presently existing phonographs. Mounted on the mounting plate 60 is a turntable motor 62, which substantially fills the vertical space between the mounting plate and the popularity meter 58.

The mounting plate includes a lug 64 adjacent the front thereof for providing a rest for the gripper arm 34, while at the rear or inner edge of the bracket are mounting tabs or lugs 66 (FIGS. 5 and 6), by which the mounting plate is supported in position, other supporting means including, for example, the bracket means 68 (FIGS. 3 and 4).

Figure 5:
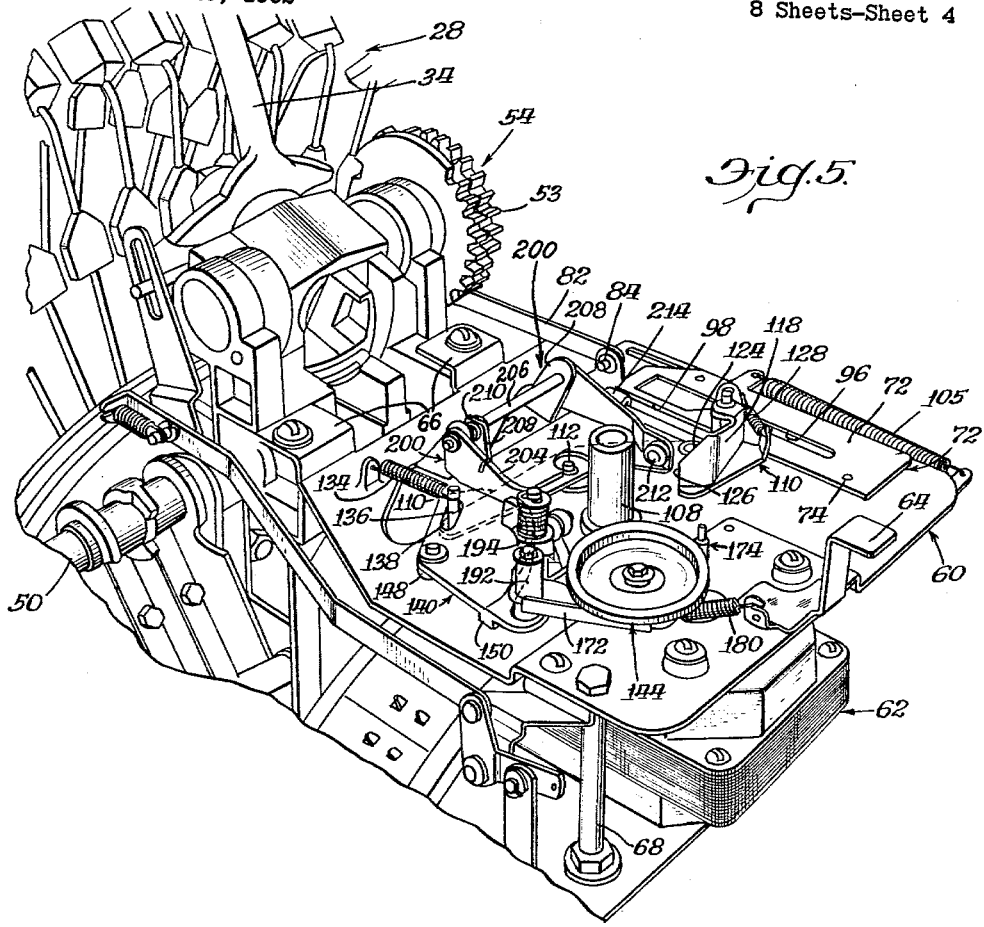
FIGURE 5 is a perspective view of certain portions of the change speed mechanism disposed under the turntable, but with the turntable omitted from the illustration.
Figure 6:
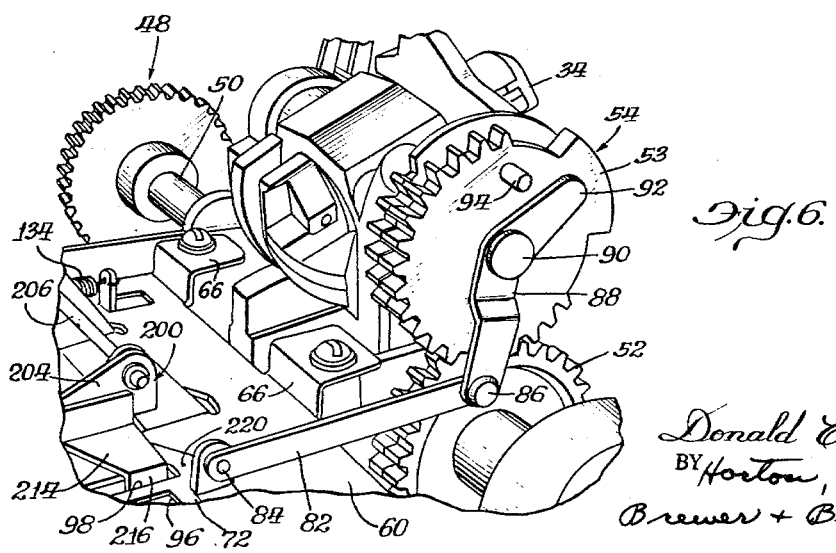
FIGURE 6 is a fragmentary perspective view of a portion of the mechanism shown in FIGURE 5, but taken at substantially the opposite side.

Mounted on the mounting plate 60 is a slide bar 72, slidable in fore-and-aft directions with respect to an observer standing at the front of the machine, this sliding movement being to the right and left in FIGURES 10 and 13, and upwardly to the left and downwardly to the right in FIGURE 5. Advancing direction of this slide bar is to the left in FIGURES 10 and 13, and upwardly to the left in FIGURE 5, while retracting direction is in the opposite direction. The slide bar 72 has a pin 74 riding in a slot 76 and another pin 78 riding in a slot 80 in the mounting plate, for guiding the slide bar in its sliding movements. The slide bar 72 is moved in advancing direction through a drive link 82 pivotally connected at one end at 84 with the slide bar, and at its other end pivotally connected at 86 (FIG. 6) to one end of a drive bracket 88 pivoted intermediate its ends, by means of a stud 90, on the gear 53. The drive bracket has an oppositely extending arm 92 engageable by a pin 94 on the gear 53 in a certain step in the operation of the phonograph, namely, transferring a record from the magazine to the turntable, in a manner to be described fully in detail hereinbelow. The slide bar is biased to retracted position by a tension spring 105.

The slide bar 72 includes slots 96 and 98 (FIGS. 10 and 13), the function of which will be described in detail hereinbelow. The slot 96 has a narrow portion 100, and a wide portion 102 defining therebetween a shoulder 104 facing in the direction of advancement of the slide bar. The other slot 98 may be of uniform outline, and both slots extend generally in the direction of sliding movement of the slide bar.

The various operating members mounted on the mounting plate 60, best seen in FIGURES 5, 6, 10 and 13, are arranged in certain predetermined relation to the turntable, and about the vertical axis thereof, indicated at 106. The turntable is supported by a bearing 108 secured in the mounting plate, to be described further hereinbelow, in connection with the detailed construction of the turntable and the sensing elements carried thereby.

A transversely extending cam lever 110 is mounted on the mounting plate by means of a stud 112, for swinging movement about a vertical axis intermediate the ends of the lever. This cam lever has guiding control through an arcuate slot 114 concentric about the axis of the stud 112, and receiving a pin or stud 116 secured in the mounting plate.

Mounted on the cam lever adjacent the end thereof which is near the slide bar 72 is a sensor lever 118, mounted for swinging movement on a pin 120 secured in and carried by the cam lever. The sensor lever 118 at one end has an angular extension 122, extending generally toward the axis 106 of the turntable in its normal retracted position, i.e., it has a horizontal component of direction generally radially of the turntable. This extension 122 has a vertically inclined camming surface 124 (FIG. 5) engaged by an element of the sensing device in a manner to be described hereinbelow. Leading downwardly from the camming surface 124 is an edge surface 126 which may be at or near the vertical. The sensor lever 118 is light in weight and easily swingable, being biased in clockwise direction by means of a light tension spring 128 connected between an arm 130 of the sensor lever and the end extremity of the cam lever 110. The arm 130 which extends oppositely from the extremity 122 is provided with a pin 132 extending into the slot 96 for engagement by the shoulder 104 under certain conditions, as explained below. The edge of the slot serves as a stop for engagement by the pin 132 and limiting the movement of the sensor lever in clockwise direction. When the pin 132 is engaged by the shoulder 104 and the slide bar 72 is advanced, the cam lever 110 is rotated or swung counter-clockwise, in advancing direction as described hereinbelow, and this cam lever is biased to retracted position by a tension spring 134 connected at one end to the mounting plate and at the other end to the cam lever through the intermediary of an upwardly extending pin 136 (FIG. 13) mounted in the end thereof. The pin 136 rides in a slot 138 in an idler cam 140 mounted for swinging movement about a pin 142 secured in the mounting plate 60. The slot 138 is offset from the axis of the pin 142, as will be noted, and upon swinging of the cam lever 110 the idler cam 140 is swung in corresponding direction within a limited range. The idler cam 140, utilized for controlling the movements and position of an idler 144, as explained fully hereinbelow, is provided with an arcuate slot 146, concentric about the pin 142, this slot having a linear extent of in the neighborhood of 90°. The idler cam 140 may be provided with a hub 148 (FIGS. 5, 11 and 14), bearing on the mounting plate, and another bearing element 150 arcuate in shape and also bearing on the mounting plate, the hub and bearing element supporting the idler cam in accurate position parallel with the mounting plate.

The slot 146 is bounded on its inner surface by a cam element 152, of which the element 150 may be an extension, of minor radial extent and having a vertically inclined camming surface 154 facing generally in advancing direction, i.e., in clockwise direction (FIGS. 10 and 13) corresponding to counter-clockwise advancing direction of the cam lever 110. The camming surface 154 leads into a top horizontal surface 156. The camming element 152 serves to provide a lifting or vertical movement of the idler 144, but the idler cam 140 also includes camming elements for providing a horizontal component of movement of the idler. The latter elements include a camming element 158 (FIG. 13) of minor radial extent having vertical, relatively angular camming surfaces 159 and 160, each with a component of direction transverse to the arcuate movement of the idler cam, but in mutually opposite senses. The idler cam 140 includes a portion or element 162 outwardly of the slot 146 that has a top surface 164 lower than other portions thereof (FIG. 7) for providing clearance for a pin as referred to below.

The idler 144 serves as the means for engaging the turntable for rotating the latter, the turntable having a downwardly extending peripheral flange 166 (FIGS. 7 and 15) which when the turntable is positioned in place surrounds certain operating parts, including the idler, the idler engaging the inner surface of the flange for rotating the turntable. The position and dimension of the turntable are indicated in dot-dash lines in FIGURES 10 and 13, the inner surface of this flange being also indicated by the line 168.

The idler 144 is mounted for free rotation on a pin 170 secured in an idler link 172 that is free to float in various directions as described hereinbelow. The idler is driven by the motor 62 (FIG. 4) through a drive shaft 174 extending upwardly through an opening in the mounting plate 60 and in position for engaging the idler 144. The shaft 174 has a lower, large diameter friction surface 176 (FIG. 15) adapted for driving the idler at a faster rate, namely, at a 45 r.p.m. rate, and an upper, small diameter friction surface 178 for driving it at the slower 33⅓ r.p.m. rate. The idler 144 is positioned for movement in both horizontal and vertical directions, and is biased horizontally to an operative position by a tension spring 180 having one end secured to a fixed portion of the mounting plate 60 and the other end to the adjacent end of the idler link 172. This tension spring biases the link in such direction as to bias the idler into engagement with the drive shaft 174 and the particular friction surface thereof which it happens to be in alignment with. The idler link 172 bears against a pin 182 fixed in the mounting plate and extending upwardly through a notch 184 in the idler link. The pin 182 limits the swinging movement of the idler link thereagainst, and, when engaged by the shoulder 186 of the notch, limits the movement of the idler link longitudinally or in the general direction of the tension of the spring 180.

The idler link 172 is secured to a pin 188 (FIGS. 7, 11–14) which supports the idler link and idler in the desired position, namely, in parallel alignment with the mounting plate, the securement of the idler link to the pin being by suitable means such as by riveting. The pin 188 is carried by a toggle link 190 having a sleeve 192 at one end operably receiving the pin, and a sleeve 194 at the other end mounted for vertical sliding movement on a pin 196 fixed in the mounting plate and projecting through the arcuate cam slot 146. The mounting plate may be provided with a hole 198 to receive the lower end of the pin 188 in the vertical movements of the latter, and to permit limited transverse movement of the pin. The sleeve 194 being slidable on the pin 196, as stated, provides for vertical movements of the entire link 190 and thus of the idler link 172 carried thereby and consequently of the idler 144 itself. The link 190 is biased downwardly by a compression spring 199 confined between the sleeve 194 of the link and a clip 201 secured in the upper end of the pin. The securement of the pin 196 may be as by riveting, as shown in FIG. 7.

The sleeve 194 of the link 190 at its lower end is generally wedge-shaped as indicated at 203 (FIGS. 7, 11 and 14), which provides an inclined camming surface 205. The lower end surface of the sleeve 194 bears on the camming element 152, and upon arcuate movement of the latter due to swinging movement of the idler cam 140 the camming surface 154 engages the camming surface 205 and lifts the sleeve 194 and the link of which it is a part. Continued movement of the idler cam in the direction indicated results in the sleeve 194 riding up onto the upper surface of the camming element 152 as best shown in FIGURE 14.

Movement of the idler cam 140 in advancing direction, namely clockwise (FIGS. 10 and 13), in addition to lifting the link 190 by the camming element 152, as just described, produces a horizontal movement of the idler 144. This is accomplished by the camming element 158. Attention is directed to FIGURES 10 and 13 showing the positions of the parts respectively before and after the horizontal movement just referred to. In the position of the elements shown in FIGURE 10, the pin 188 is in engagement with or in register with the camming element 159 which, as noted above, includes a component of direction transverse to the arcuate direction of movement thereof. As the idler cam moves in clockwise direction from the position shown in FIGURE 10, the camming element 159 engages the pin 188 and moves it horizontally in the corresponding direction, which is diagonally to the left and toward the observer, as viewed in FIGURES 10 and 13. This movement pulls the idler link 172, and pulls the idler out of engagement with the shaft 174, as well as the turntable, as shown in FIGURE 12, where the space between the idler and both of those elements are indicated. After this horizontal movement is accomplished, and in continued swinging movement of the idler cam 140, the sleeve 194 rides up on the camming element 154 which raises the idler 144 as noted above. This vertical movement occurs while the idler is out of engagement with the drive shaft and the turntable.

In the position of the parts as shown in FIGURE 10, the idler 144 is in engagement with the lower, large diameter portion 176 of the shaft 174, and after the idler is raised in the manner just referred to, the idler is in register with the small diameter upper portion 178. The operating parts are so relatively proportioned and positioned that after the idler has been raised sufficiently, the pin 188 rides onto the camming element 160 enabling the tension spring 180 to pull the idler link and idler into operative position in which the idler engages the small diameter friction surface 178 of the shaft. Upon return movement of the idler cam 140, i.e., in counterclockwise direction, the steps just described are essentially reversed, i.e., the camming element 160 pulls the idler horizontally away from the drive shaft 176 and turntable flange, then the link 190 is lowered by the sleeve 194 riding down on the camming element 154, and thereafter the pin 188 encounters the camming element 159, again enabling the spring 180 to pull the idler link and idler toward the drive shaft into operative position in which the idler engages the large diameter portion 176 of the drive shaft 174, and the turntable flange. Because of the separation of the idler from the drive shaft and turntable flange, there is no drag by the idler on either the drive shaft or the turntable in the vertical movements of the idler in either upward or downward direction.

The construction also includes a sensor lifter indicated in its entirety at 200 (FIGS. 5, 7, 10 and 13). This lifter includes a transverse piece 202 having upturned arms 204 at its ends, the arms having aligned apertures pivotally and swingably receiving a pin 206 mounted in lugs 208 struck up from the body of the mounting plate 60. A coil spring 210 surrounds the pin and has ends respectively engaging one of the lugs 208 and arms 204 for biasing the lifter in downward direction. The arms 204 are extended beyond the transverse piece where rollers 212 are mounted thereon, these rollers being on opposite sides of the turntable axis 106 and proximate to a diameter running through that axis. At one side of the lifter is an extension 214 secured to the adjacent arm 204 as by spot welding, this extension having a downwardly extending lug 216 in position for projecting through the slot 98 in the slide bar 72 and through a suitably located hole 218 in the mounting plate. The lug 216 extends into the slot 98 in certain positions of the slide bar, as explained below, and it also rides up onto a solid portion 220 of the slide bar positioned longitudinally beyond the slot 98, in full retracting movement of the slide bar.

Attention is next directed to FIGURES 7–9 and 15–17 for detailed construction of certain portions of the sensing means that are carried by the turntable. The turntable 32 includes a top element 222 from which the flange 166 depends, and a central depending sleeve 224. A shaft 226 is secured in the turntable with a large bearing portion 228 extending downwardly in the sleeve 224, and an upwardly extending guiding portion 230, extending above the turntable top and received in the small aperture 36 of the 33⅓ r.p.m. records 30a. A knurled collar 232 may be provided on the shaft for aiding in securing it in the turntable, the turntable being made of suitable material such as die cast metal. The bearing 108 referred to above is secured in the mounting plate 60 in any suitable manner, such as by riveting it over the marginal portion surrounding the aperture in which it is mounted, as indicated at 234. The bearing element 108 is tubular in shape, opening upwardly and receiving the shaft 228 for free rotation therein. A bearing ball 236 is embedded in the material of the bearing, and supports the shaft 228, the latter bearing at its lower end on the ball. It will be appreciated that the shaft 228 and bearing 108 are of substantial length to support the turntable in the desired accurate position.

Figure 15:
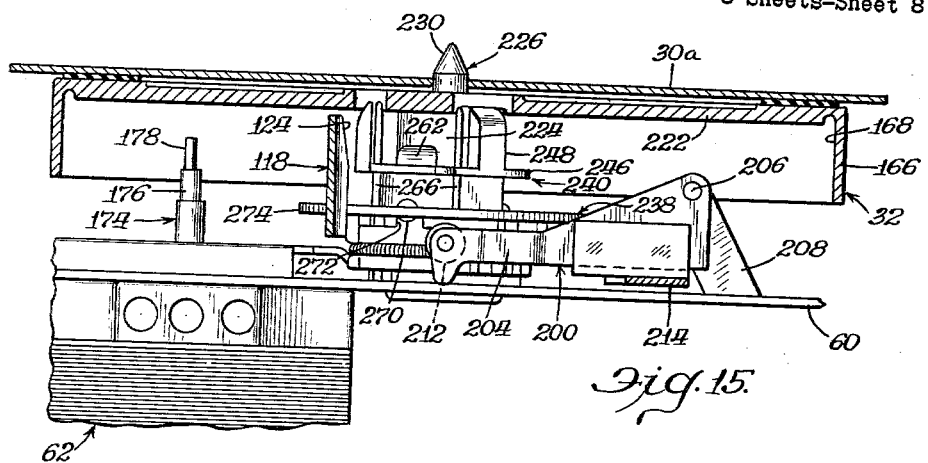
FIGURE 15 is a sectional view through the turntable, oriented transverse to the view of FIGURE 7, and showing certain parts in different positions.
Figure 16:
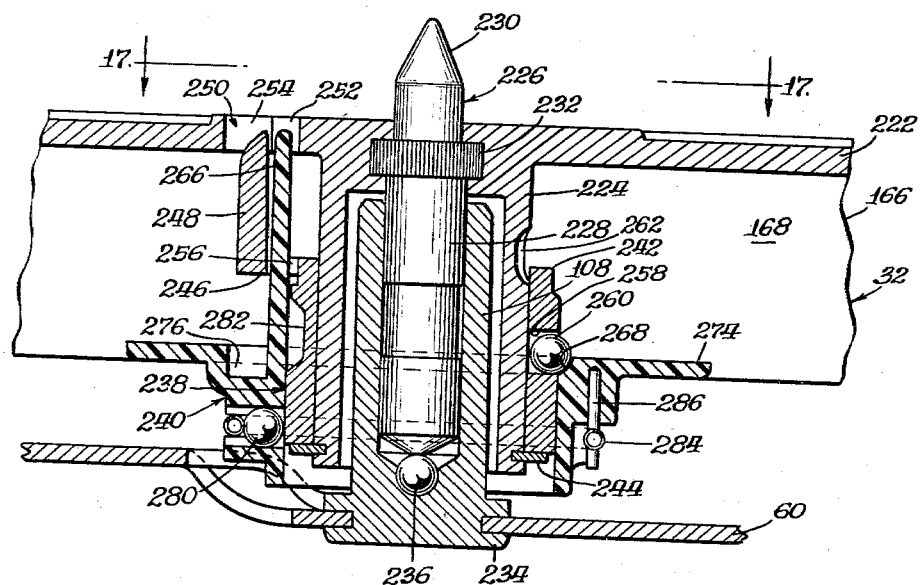
FIGURE 16 is a view similar to FIGURE 8, but showing certain parts in different positions.
Figure 17:
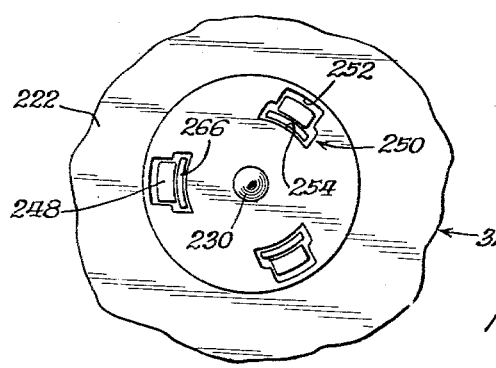
FIGURE 17 is a plan view taken at line 17—17 of FIGURE 16, on a relatively smaller scale.

As noted above, the turntable includes means 41 for sensing the records by actually being engaged by records of one kind, and the portion exposed above the turntable effective in this sensing engagement is represented as a whole in FIGURES 3, 4, 7 and 8. The portion of the sensing and control means that is carried directly by the turntable includes two main parts which are designated respectively a "45 hub" 238 and a sensor 240, both of which are vertically slideable relative to the turntable for exposure of portions thereof above the turntable, and complete withdrawal thereof below the top surface of the turntable. The 45 hub 238 includes a sleeve or hub proper 242 surrounding the sleeve 224 for free vertical sliding movement thereon. A removable clip 244 of known kind is detachably secured to the lower end of the sleeve 224 to retain the 45 hub on the sleeve. At the upper end of the sleeve 242 are a plurality of, and preferably three, radial flange portions or ears 246 (FIGS. 15 and 16). Leading upwardly from each of the ears 246 is a prong 248 (FIGS. 7, 8, 15 and 16), which is slidably projectable through a corresponding aperture 250 (FIG. 17) in the turntable. Each of these apertures 250 includes a radially outer reduced portion 252 and an inner enlarged portion 254, the prongs 248 being aligned with and received in the outer reduced portions. Each of the ears 246 includes an aperture 256 immediately inwardly of the corresponding prong 248 and in alignment with the respective enlarged portion 254 of the aperture 250.

The sleeve 242 of the 45 hub is provided with a plurality of side apertures 258, preferably three in number, in which are disposed steel locking balls 260. In register with the apertures 258 and thus the corresponding balls 260 are notches 262 in the outer surface of the sleeve 224 of the turntable, these notches remaining in radial alignment with the corresponding apertures as will be understood, the 45 hub being locked against rotation relative to the turntable by the prongs 248 in the apertures 250. The balls 260 are of a diameter greater than the thickness of the sleeve 242 to provide a locking effect by the sensor 240 as described hereinbelow.

The sensor 240 is preferably made of a very light material, such, for example, as a known plastic, because of the desired sensitivity and responsiveness provided by such lightness. This sensor includes a sleeve or hub portion 264 surrounding the sleeve 242 of the 45 hub, and dimensioned for free vertical sliding movement relative thereto. The sensor 240 includes a plurality of, and in this case three, prongs or fingers 266 extending upwardly and projecting through the apertures 256 in the 45 hub, and the apertures 250 in the turntable. Preferably these fingers 266 are of greater circumferential dimension than the prongs 248 (FIG. 17) and are positioned in the enlarged portions 254 of the apertures 250. These fingers 266 are of greater length than the prongs 248 for direct engagement by the records as distinguished from engagement with the prongs 248.

The balls 260 are retained in the apertures 258 by the sleeve 264 of the sensor, the relation between the parts being such that when the 45 hub is in elevated position so that the balls 260 can fall into the notches 262, the sensor can move upwardly past the balls and they retain the balls in place therein. The sensor thus provides a locking effect against the movement of the 45 hub, i.e., the balls are positively and non-yieldingly retained in the notches so as to prevent the 45 hub from dropping. When the sensor 240 is lowered relative to the 45 hub, as is described in detail hereinbelow, the balls may move outwardly and fall into depressions 268 (FIGS. 8 and 16) provided in the sensor. When the sensor lowers and these depressions register with the balls, the weight of the 45 hub becomes effective for camming the balls out of the notches 262, the notches being appropriately shaped for that purpose. While the 45 hub is limited in downward movement by the clip 244, the sensor is limited in downward movement relative to the 45 hub by means of a stop 270, which may be a set screw (FIGS. 7 and 9) secured in the 45 hub and receivable in a downwardly opening notch 272 in the sleeve of the sensor.

The sensor 240 is provided with a disk or flange 274 of a predetermined diameter for purposes to be stated hereinbelow, and this flange may be positioned for engaging the under surface of the top element 222 of the turntable for providing limiting means for upward movement of the sensor. Disposed inwardly of the disk 274 are depressions 276 which receive the outer portions of the ears 246 and lower portions of the prongs 248 on the 45 hub when both the 45 hub and sensor are in uppermost positions.

Detent means is provided for yieldingly retaining the sensor in upper position—the sensor is provided with a plurality of side apertures 278 (FIGS. 8 and 9), preferably three in number, in which are disposed steel balls 280. These balls are positioned for falling into notches 282 in the outer surface of the sleeve 242 of the 45 hub when the sensor is raised relative to the 45 hub. The balls are held in place by a garter spring 284 surrounding the sensor. This spring is preferably a linear piece with its ends detachably secured to, as by hooking over, a pin 286, fixed in the sensor. This pin, as will be noted from FIGURE 9, is disposed equidistant between two adjacent ones of the balls 280, with the result that the pressure exerted by the spring on the balls is uniform, the tension of the spring being distributed throughout its length, so that the securement at the pin 286, which is equidistant between two balls, does not impair this distribution of the tension of the spring. The spring 284 is retained in place axially of the sensor by means of circumferential grooves 288 formed by a series of lugs 290.

Due to the yielding character of the spring 284, the balls 280 may be cammed out of the corresponding notches 282 in response to downward movement of the sensor 240, the edges of the notches being preferably inclined to assist in that function. However, in the absence of downward pressure exerted on the sensor, the spring 284 is capable of retaining the balls 280 in the notches 282, and thus retain the sensor in elevated position (FIG. 8) when it is in that position, and in this same relation of the parts the sensor acts as a positive lock on the balls 260 to retain the 45 hub in raised position.

The sensor 240, as will be appreciated, is fixed against rotation relative to the 45 hub and the turntable by reason of the fingers 266 projecting through the apertures 256 in the 45 hub, and the apertures 258 in the turntable, and thus the turntable, 45 hub, and sensor rotate as a unit. While the fingers 266 and prongs 248 are three in number each, the invention is not to be limited thereto, although as presently advised, three appears to be the most satisfactory number. The prongs 248 preferably are provided with rounded end surfaces to facilitate movement of the 45 records 32b thereover, the operation being that only the 33⅓ records 32a having small apertures 36 perform a sensing operation, while the other records 30b do not change any controlling operation on the phonograph.

The turntable with the 45 hub and sensor mounted therein forms a self-contained unit that may be mounted on and removed from the mounting plate as such. The unit is applied to the mounting plate by inserting the shaft 228 in the bearing 108 and lowering it, while manipulating the idler 144 to manually pull it in away from the flange 166 of the turntable. With the turntable thus in place, the rollers 212 on the lifter 200 are under the marginal portion of the disk or flange 274 of the sensor (FIGS. 7 and 10). The lifter is normally in raised position, being so retained in that position by the slide bar 72 (FIGS. 10 and 15) when in retracted position (FIG. 10), since in such position, the lug 216 of the lifter engages the solid portion 220 of the slide bar, and the swinging moment of the lifter is such that the rollers 212 in the extended ends of the arms are in the desired elevated position. In such position (FIG. 7) the flange or disk 274 of the sensor is butted against the under surface of the top element of the turntable. The sensor 238, as will be understood, in being raised also raises the 45 hub, due to the engagement of the ears 256 in the depressions 276 (FIG. 8), and after being raised the 45 hub is positively locked in position, as above described.

The flange or disk 274 on the sensor is of such diameter as to engage the inclined camming surface 124 of the sensor lever 118, so that upon descent of the sensor this flange or disk so engages the sensor lever and swings the latter in counterclockwise direction and moves it to the dotted line position indicated in FIGURE 10, where the pin 132 is in position for engagement by the shoulder 104, with consequences to be described below.

The normal position of the various parts with the sensor and 45 hub in raised position (FIGS. 7, 8 and 10), is what is known as a "45 position" so that a 45 r.p.m. record, if selected for playing, will not cause any change in the controlling functions. In this position, the idler 144 engages the large diameter, or 45 r.p.m. portion 176, of the drive shaft (FIG. 10) and the turntable will of course be rotated at 45 r.p.m. In the position of the parts just referred to, or "45 position," it is assumed for purposes of the present description that a 45 r.p.m. record is selected for playing. When a selection is made, the phonograph operates through a selecting operation according to the internal law of operation of the phonograph as set out in the patent referred to above. In such operation, the gripper arm 34 moves from the position of FIGURES 1 and 3 to and past the full line position of FIGURE 2, in which the gripper arm is turned 90° and the record laid flat on the turntable. In the case of a 45 r.p.m. record with the large central aperture 38, the record is fitted over the portion of the sensing means exposed above the table, namely, in surrounding relation to the fingers 266 and prongs 248. In such case, the 45 hub and sensor are not forced downwardly and they remain in raised position. In the movement of the gripper arm 34 in the direction just referred to, gear 53 (FIGS. 5 and 6) is rotated counterclockwise (FIG. 6), the pin 94 engages the end 92 of the drive bracket 88, and the drive link 82 is pulled to the left (FIGS. 10 and 13) which pulls the slide bar 72 in the same direction to the position shown in FIGURE 13. However, in the case of a 45 r.p.m. record, since the sensor 240 remains in raised position, and the disk 274 thereof does not fall on and engage the sensor lever 118, the latter remains in the position shown in FIGURE 10, in which the pin 132 is out of position for engagement by the shoulder 104. In such case, the movement of the slide bar 72 to the left in advancing direction does not perform any function in the controlling operations, but each time the slide bare is advanced (moved to the left) the lug 216 on the lifter 200 falls into the slot 96, enabling the lifter to lower.

After the playing of a record, regardless of the kind thereof, the gripper arm 34 moves back to the position of FIGS. 1 and 3, and in so doing, the gear 53 (FIG. 6) rotates in the opposite direction and enables the slide bar 72 to be retracted by the spring 105 to the position shown in FIGURE 10.

On the other hand, when a 33⅓ r.p.m. record is selected and moved down into a position for placement on the turntable, the marginal portion of the record around the small central aperture 36 therein engages one or more of the fingers 266 of the sensor. This movement of the record produces sufficient force to cause the spring 284 of the detent means to yield, and thus to move the sensor downwardly relative to the 45 hub. After the sensor has moved downwardly sufficiently, the balls 260 which lock the 45 hub in raised position, are enabled to move outward into the depressions 268, whereupon the 45 hub descends under its own weight. The 45 hub and sensor then move to their lowermost position shown in FIGURE 16, in which the top surface of the turntable is clear, except for the center pin or extension 230 of the shaft 228. This extension 230 is received in the aperture 36 of the record, the fit therein being such as to guide the record in concentric position, in the usual manner.

The descent of the sensor 240 produces control operations to effect rotation of the turntable at the 33⅓ r.p.m. speed. This is effected through the flange or disk 274 falling onto and engaging the inclined camming surface 124 on the sensor lever 118 (FIG. 10). This swings the sensor lever counterclockwise to the dotted line position wherein the pin 132 is in line with the shoulder 104. Then upon movement of the slide bar 72 in advancing direction, the shoulder 104, acting through the pin 132 draws the sensor lever 118 in the same general direction, which in turn swings the cam lever 110 in counterclockwise direction. This movement of the cam lever causes the idler cam 140 to swing in clockwise direction, with consequent movements referred to above, namely, the idler 144 is withdrawn from the drive shaft 174, the idler is raised and then the idler is released and it is drawn by the spring 108 back into engagement with the drive shaft and the inner surface of the flange of the turntable.

While the record is playing the slide bar 72 remains in advanced position, or that shown in FIGURE 13 which retains the controlled parts in their new positions throughout the playing of the record. Upon movement of the slide bar in retracting direction, the cam lever 110 and idler cam 140 are moved in retracting directions by the tension spring 134, and in this movement of the idler cam 140 the idler 144 is moved to its first position in a series of steps, the reverse of that just noted, namely, the idler is withdrawn from engagement with the drive shaft 174 and turntable, the idler is then lowered and then it is permitted to be retracted to its opposite position in engagement with the drive shaft and turntable, and in this position the engagement with the drive shaft is with the large diameter friction surface 176.

In the case of playing the 33⅓ r.p.m. record, the first portion of advancing movement of the slide bar 72 (to the left, FIG. 10) takes place immediately to enable the lug 216 to fall into the slot 96 to enable the lifter 200 to lower before the sensor is moved downwardly by the record, so that when the sensor moves and is in position for engaging the sensor lever 118, the lifter 200 will have been moved to extreme lower position so as not to obstruct the lowering movement of the sensor. Upon movement of the slide bar 72 to retracted position (to the right, FIG. 10) the lug 216 in each case engages the solid portion 220 of the slide bar, so that in all cases the lifter will be operative for raising the sensor and 45 hub whenever they will have been lowered.

The above described mechanism provides a very effective all-mechanical sensing and control means, and a mechanical arrangement that is extremely compact, whereby to facilitate incorporation thereof in presently existing types of phonograph. The arrangement of the moving parts and the direction of their movement is such as to provide relatively great mechanical advantage in the controlled movements of the parts, at the same time eliminating the necessity for precision-made parts, although precision in the movement of the parts is achieved. Moreover, an extremely rugged construction is provided, capable of withstanding rough usage, due to the relatively great dimensions of the parts, which is attained notwithstanding the compactness of the mechanism. Additionally, fast action of the parts is accomplished, such, for example, as in the dropping of the sensor pursuant to engagement thereof by the record. Furthermore, the turntable is precision balanced and free to rotate without any binding or other undue obstructions, notwithstanding incorporation therein of certain of the sensing elements, e.g., the sensor and the 45 hub.

While I have shown herein a certain preferred embodiment of the invention, it will be understood that changes may be made therein within the scope of the appended claims.

I claim:

1. Apparatus of the character disclosed comprising a magazine adapted to support records having different sized center holes, a turntable, variable speed means for driving the turntable, means for transferring a record from the magazine to the turntable and in return to the magazine in a single cycle of operation, means for playing a record on the turntable, means for sensing a record according to the size of the center hole thereof in the operation of placing the record on the turntable, said sensing means being receivable in a large hole in a record placed on the turntable and operative as a centering means for such a record and actuatable by a record having a small hole placed on the turntable, said sensing means being operative for controlling said driving means for driving the turntable at a speed corresponding to the size of the center hole in a record placed on the turntable, said transferring means being operative for maintaining the sensing means in position for sensing a record at each cycle of its operation.

2. The invention set out in claim 1 in which the sensing means includes three elements distributed concentrically around a center axis and projecting through openings in the turntable and extending thereabove.

3. The invention set out in claim 1, including an actuating member, means for moving the actuating member in response to operation of said transferring means in each cycle, and means controlled by the sensing means for enabling the actuating member to change the speed of the driving means in response to placement on the turntable of a record having a small center hole.

4. Apparatus of the character disclosed comprising a magazine adapted to support records having different sized center holes, a turntable, means operative for driving the turntable at each of a plurality of different speeds and having a normal position in which it drives it at a predetermined speed, means biasing the driving means to its normal position, means operative for transferring a record from the magazine to the turntable and in return to the magazine in a single cycle of operation, means for playing a record on the turntable, a slide bar biased to a retracted position, said transferring means being operative for moving said slide bar in advancing direction in response to operation of the transferring means in each cycle, sensing means engageable by the solid portion around a small center hole of a record having such a hole, a control member biased to an inoperative position, said sensing means being operative, in response to playing a record having a small center hole, for moving said control member to an active position in which it is operatively engaged by the slide bar in movement of the latter in advancing direction, and means operative, in response to advancing movement of the slide bar when it is in such engagement with said control member, for moving the driving means from its said normal position to another position in which it drives the turntable at a speed other than said predetermined speed.

5. The invention set out in claim 4 in which the sensing means includes a sensor having elements projecting through and above the turntable, means is provided for normally but releasably retaining the sensor in elevated position, and the sensor is depressed by the transfer onto the turntable of a record having a small center hole and upon lowering of the sensor it cams said control member to operative position.

6. The invention set out in claim 5 in which means is provided for raising the sensor, and the slide bar in moving to retracted position actuates the raising means and raises the sensor.

7. Apparatus of the character described comprising a magazine adapted to support records having different sized center holes, a turntable, means for driving the turntable including a multi-diameter shaft and an idler selectively positionable for transmitting drive from the corresponding diameter portion of the shaft to the turntable, the idler being biased to a normal position for driving the turntable at a first speed, cam means for shifting the idler from its normal position to an alternate position, means for transferring records from the magazine to the turntable and in return to the magazine in a complete cycle, means for playing the records on the turntable, means for sensing records placed on the turntable including a sensor member having fingers projecting upwardly through the turntable and engageable by a record having a small center hole, and means enabled by said sensor member in response to engagement by a record and consequent depression thereby for actuating said cam means for moving said idler to an alternate position by the record transferring means in a cycle of operation of the latter, said fingers, when projecting above the turntable, being operative for centering a record having a large center hole.

8. The apparatus set out in claim 7 in which the cam means includes a first cam element for moving the idler from one diameter-portion of the shaft to another and a second cam element to move it out of engagement with the shaft and turntable in its movements between different diameter-portions of the shaft.

9. The apparatus set out in claim 7 in which the cam means includes a cam member pivoted on an axis parallel with the axes of the idler and turn table, said cam member has a cam element operative upon pivoting movement thereof for moving the idler axially from engagement with one diameter-portion of the shaft to another, and another cam element operative for moving the idler in direction perpendicular to the axis thereof and out of engagement with the shaft and turntable during movement of the idler in axial direction.

10. In a phonograph having a magazine adapted for supporting records of different sized center holes, a turntable on a vertical axis, means for driving the turntable, means for transferring records between the magazine and turntable, the transferring means including an element movable horizontally adjacent one side of the turntable, and means for playing records on the turntable, the combination comprising, a slide bar connected with said movable element and movable in advancing direction in response to transfer of a record from the magazine to the turntable, said driving means including an idler engaging the turntable adjacent the side thereof opposite said slide bar, cam means adjacent the idler for controlling the movement thereof between opposite positions for driving the turntable at respective different speeds, a lever extending generally across the area covered by the turntable and operatively connected with the cam means, means for sensing records placed on the turntable, and means controlled by the sensing means and operative in response to placement on the turntable of a record having a small center hole for establishing a connection between said lever and slide bar.

11. Sensing means for use in a phonograph having a magazine, a turntable having a vertical shaft, means for transferring records between the magazine and turntable, and control means adapted to be operated by said record transferring means, comprising a sensor member slidably mounted on said shaft and having fingers projecting through openings in the turntable, and movable between an upper position in which the fingers project above the turntable, and a lower position in which they are at least as low as the upper surface of the turntable, detent means releasably retaining the sensor member in the upper position, and a sensor lever mounted on said control means below the turntable and having a camming element inclined to the vertical and engageable by the sensor member on descent of the latter and thereby swingable by the sensor member, said sensor lever being operatively associated with said record transferring means whereby to render said control means operable by the record transferring means when the sensor lever is swung by the sensor member.

12. The invention set out in claim 11 in which a hub member is mounted on the shaft, means is provided for positioning it thereon, the detent means includes balls in the sensor member engageable in recesses in the shaft, and a tension spring surrounds the sensor member and engages the balls and biases them inwardly.

13. The invention set out in claim 12 in which the tension spring is a linear member secured at its ends at a common point on the sensor member midway between two adjacent ones of the balls.

14. The invention set out in claim 11 in which a hub member is also provided and mounted for sliding movement on the shaft, including a hub portion on the shaft and fingers projecting through said openings in the turntable, and in which positive locking means is provided for retaining the hub member in upper position, said locking means are controlled by said sensor member.

15. Sensing means comprising a turntable on a vertical axis and having a mounting shaft extending therebelow, a sensor member slidably mounted on said shaft and having fingers projecting through openings in the turntable and movable between an upper position in which the fingers project above the turntable and a lower position in which they are at least as low as the upper surface of the turntable, detent means releasably retaining the sensor member in the upper position, a hub member mounted for sliding movement on said shaft and including a hub portion on the shaft and fingers projecting through said openings in the turntable, said hub member having apertures therein and said shaft having recesses, and balls in said apertures, said balls being adapted to fit in said recesses in the shaft when both the sensor member and hub member are in upper position, and when in said position the sensor member surrounding the balls in the hub member and non-yieldingly retaining them in said recesses and thereby forming a positive locking means for retaining the hub member in upper position, and a sensor lever mounted below the turntable and having a camming element inclined to the vertical and engageable by the sensor member on descent of the latter and thereby swingable by the sensor member.

16. The invention set out in claim 15 in which the fingers on the sensor member project upwardly beyond those of the hub member, when the members are in upper position, and when depressed from above the sensor member moves beyond confining position relating to the balls in the hub member, when it moves to a position in which the upper ends of the fingers on the sensor member are as low as the upper ends of the fingers on the hub members.

17. The invention set out in claim 16 in which the fingers on each the sensor member and hub member are three in number and respectively radially aligned with those on the sensor member disposed radially inwardly of those on the hub member.

18. The invention set out in claim 17 in which the sensor member is provided with a disc member adjacent its lower end, having a circular peripheral edge adapted to operate as a camming element in downward movement, and a flat under surface adapted to be engaged by a lifter for raising the sensor member and hub member.

19. Apparatus of the character disclosed comprising, a magazine adapted for supporting records having different sized center holes, a turntable having a mounting shaft, means for playing records on the turntable, means for transferring records between the magazine and turntable, a sensor member slidably mounted on said shaft and having fingers projecting through openings in the turntable and movable between an upper position in which the fingers project above the turntable and a lower position in which they are at least as low as the upper surface of the turntable, said fingers being received in large center holes in records and being operative for centering such records, detent means releasably retaining the sensor member in the upper position, means for driving the turntable at different speeds, means for controlling the drive means, actuating means driven by the transferring means, means controlled by lowering of the sensor member for enabling said actuating means for controlling the drive means for driving the turntable at a different speed, and means responsive to movement of the transferring means for raising the sensor member.

20. Apparatus of the character disclosed comprising a magazine adapted to support records having different sized center holes, a turntable, variable speed means for driving the turntable, means for transferring a record from the magazine to the turntable and return to the magazine in a single cycle of operation, means for playing a record on the turntable, said turntable having a relatively small-diameter center pin extending above its top surface, means for sensing a record including elements disposed in a circle concentric with and of larger diameter than said center pin, said sensing means being receivable in a large center hole of a record having such a hole placed on the turntable and operative for centering such record, and being engageable at the top and thus depressible by a record having a small center hole placed on the turntable, said sensing means being operative in response to being received in a large hole and engaged by a record having a small hole for controlling said driving means for driving the turntable at a speed corresponding to the size of the center hole in each record placed on the turntable, said transferring means being operative for maintaining the sensing means in position for sensing a record at each cycle of its operation.

References Cited by the Examiner

UNITED STATES PATENTS

| | | | |
|---|---|---|---|
| 2,673,089 | 3/54 | Osborne | 274—9.1 |
| 2,762,627 | 9/56 | Johnson | 274—39 |
| 2,941,809 | 6/60 | Schneider | 274—9.1 |

LOUIS J. CAPOZI, *Primary Examiner.*

A. F. GUIDA, *Examiner.*